US012706991B2

(12) United States Patent
Parla et al.

(10) Patent No.: US 12,706,991 B2
(45) Date of Patent: Aug. 11, 2026

(54) END-TO-END TRANSACTIONAL MICROSEGMENTATION

(71) Applicant: Cisco Technology, Inc., San Jose, CA (US)

(72) Inventors: Vincent E. Parla, North Hampton, NH (US); Walter Hulick, Pearland, TX (US)

(73) Assignee: Cisco Technology, Inc., San Jose, CA (US)

( * ) Notice: Subject to any disclaimer, the term of this patent is extended or adjusted under 35 U.S.C. 154(b) by 694 days.

(21) Appl. No.: 18/126,735

(22) Filed: Mar. 27, 2023

(65) Prior Publication Data

US 2024/0333822 A1 Oct. 3, 2024

(51) Int. Cl.
*H04L 69/166* (2022.01)
*H04L 69/22* (2022.01)
*H04L 69/321* (2022.01)

(52) U.S. Cl.
CPC ............ *H04L 69/166* (2013.01); *H04L 69/22* (2013.01); *H04L 69/321* (2013.01)

(58) Field of Classification Search
CPC ...... H04L 69/166; H04L 69/321; H04L 69/22
See application file for complete search history.

(56) References Cited

U.S. PATENT DOCUMENTS

2014/0297846 A1 10/2014 Hoja et al.
2018/0176261 A1 6/2018 Bansal et al.
2020/0076733 A1* 3/2020 Venkataraman ........ H04L 45/74
2021/0182169 A1* 6/2021 Mardente ............ H04L 43/0894
2021/0227056 A1* 7/2021 Aluvala .............. H04L 41/0895
2021/0336959 A1 10/2021 Shah et al.
2022/0006757 A1* 1/2022 Asghar ................... H04L 63/20
2022/0021707 A1* 1/2022 Panchalingam ........ H04L 63/20
(Continued)

FOREIGN PATENT DOCUMENTS

WO WO-2022231668 A1 * 11/2022 ........... H04L 45/306

OTHER PUBLICATIONS

Kak, Sanjay. Zero Trust Evolution & Transforming Enterprise Security. Diss. California State University San Marcos, 2022.
(Continued)

*Primary Examiner* — Angela Widhalm De Rodriguez
(74) *Attorney, Agent, or Firm* — Lee & Hayes, P.C.

(57) ABSTRACT

Techniques for microsegmenting network communication transactions from end-to-end over an entire network communication path between a client device and a workload. The techniques may include determining that a first layer of a packet traversing the communication path includes a first metadata tag associated with a first segmentation ecosystem applying a microsegmentation policy along a first portion of the communication path. Based at least in part on the first metadata tag, a second metadata tag may be determined that is associated with a second segmentation ecosystem applying the microsegmentation policy along a second portion of the communication path. The second metadata tag may then be embedded within a second layer of the packet such that the second segmentation ecosystem is capable of applying the microsegmentation policy to the packet along the second portion of the communication path.

20 Claims, 8 Drawing Sheets

(56) References Cited

U.S. PATENT DOCUMENTS

2023/0043721 A1* 2/2023 Liu ......................... H04L 45/00
2023/0093278 A1* 3/2023 Majila ................... H04L 45/745
709/238

OTHER PUBLICATIONS

Sarkar, Sirshak, et al. "Security of zero trust networks in cloud computing: A comparative review." Sustainability 14.18 (2022): 11213.

* cited by examiner

Figure 1:
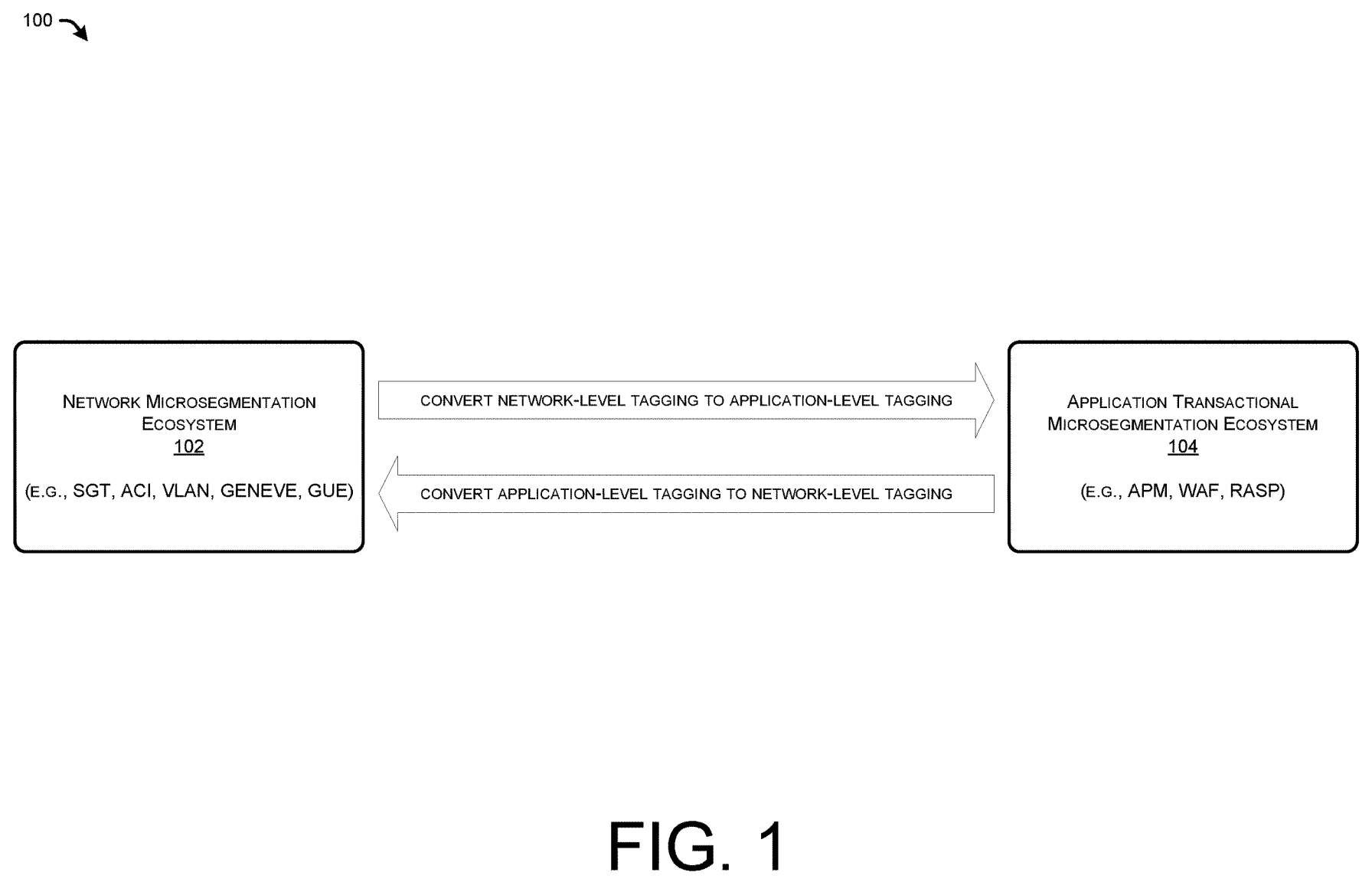

100

NETWORK MICROSEGMENTATION ECOSYSTEM
102
(E.G., SGT, ACI, VLAN, GENEVE, GUE)

CONVERT NETWORK-LEVEL TAGGING TO APPLICATION-LEVEL TAGGING

CONVERT APPLICATION-LEVEL TAGGING TO NETWORK-LEVEL TAGGING

APPLICATION TRANSACTIONAL MICROSEGMENTATION ECOSYSTEM
104
(E.G., APM, WAF, RASP)

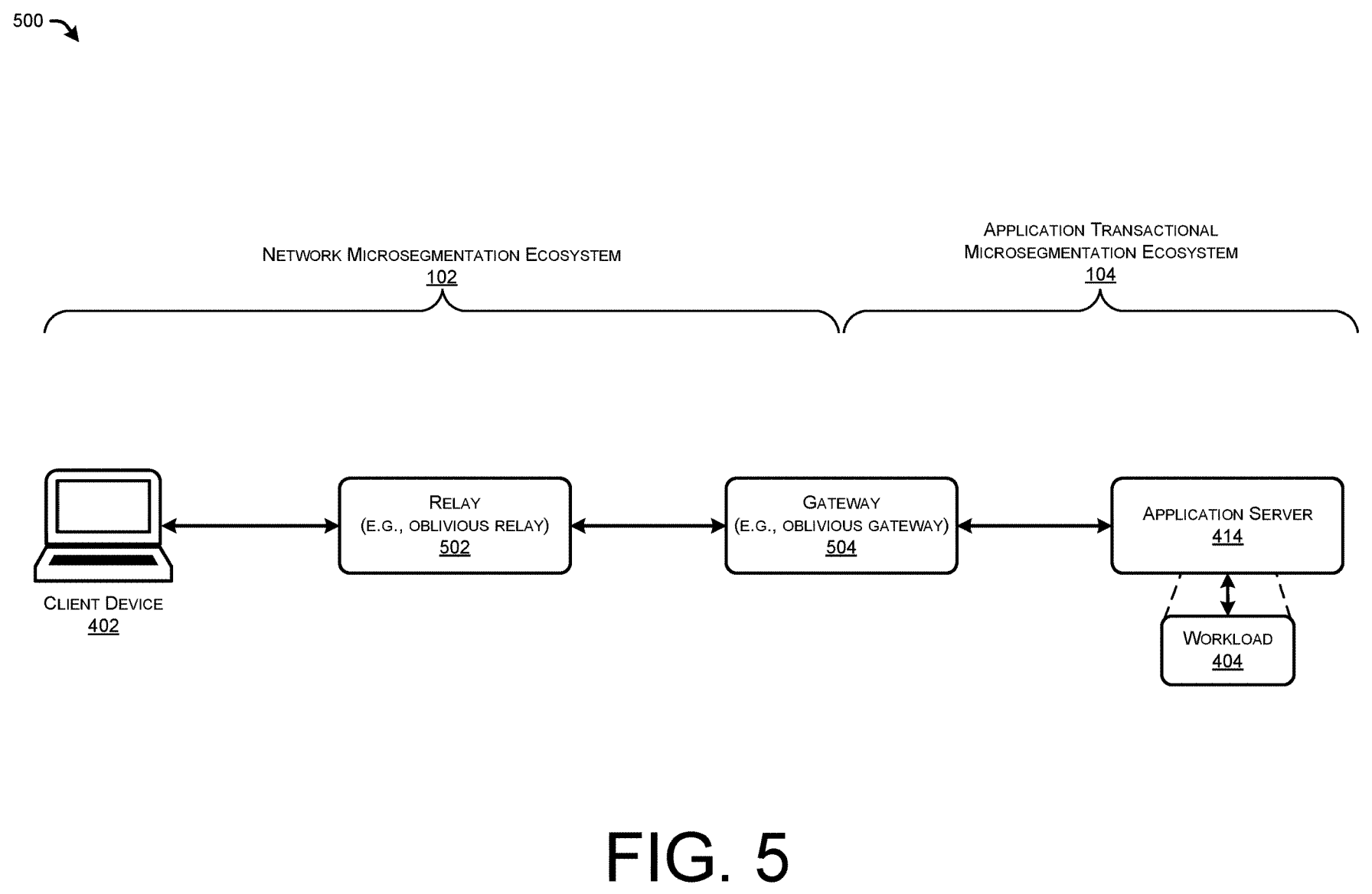

Application Transactional Microsegmentation Ecosystem 104

Network Microsegmentation Ecosystem 102

Application Server 414

Workload 404

Gateway (e.g., oblivious gateway) 504

Relay (e.g., oblivious relay) 502

Client Device 402

FIG. 5

END-TO-END TRANSACTIONAL MICROSEGMENTATION

TECHNICAL FIELD

The present disclosure relates generally to techniques for, among other things, for sharing context between application and network layers to enforce microsegmentation polices at both layers for transactional-level microsegmentation across an entire communication path from a workload to a client, and vice-versa.

BACKGROUND

Application performance management tools have become a common tool in the enterprise landscape for providing insights into both the runtime health supporting an application, as well as flow tracing between the end user and the backend hosted application. Application performance management tools provide "on demand" troubleshooting capability as well as information as to trends in end user behavior. Because these tools are generally embedded into the Application runtime, they have a unique visibility into aspects of business transactions that are not available to other types of monitoring tools found in the OS, network, and/or other components. This information is rarely shared, if ever, with other technologies that would benefit from having a correlated view of the business transaction purpose and/or the individual user profile requesting the transaction.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 is an illustration of the techniques described herein for performing end-to-end microsegmentation at both the application and network layers.

FIG. 5 illustrates an example relay and gateway architecture in which the techniques of this disclosure may be performed.

DESCRIPTION OF EXAMPLE EMBODIMENTS

Overview

Figure 2:
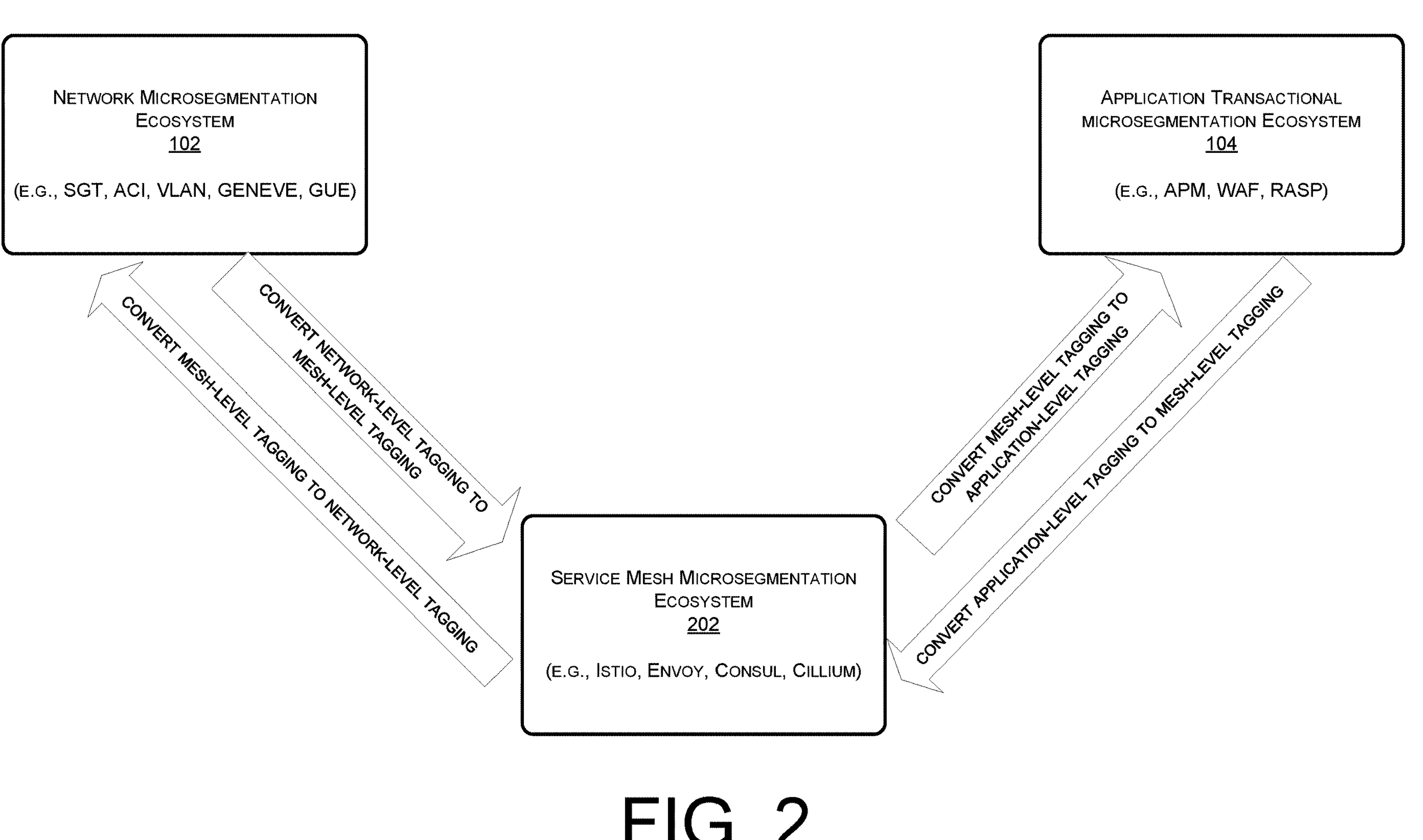
FIG. 2 is another illustration of the techniques described herein for performing end-to-end microsegmentation at the network level, service mesh level, and application level of a communication path.

This disclosure describes various technologies associated with performing end-to-end microsegmentation for network communication transactions at both the application and network layers. By way of example, and not limitation, the techniques disclosed herein may include receiving a packet that is traversing a communication path through a network between a client device and a workload, the packet associated with a communication transaction between the client device and the workload. The techniques may also include determining that a first layer of the packet includes a first metadata tag associated with a first segmentation ecosystem applying a microsegmentation policy along a first portion of the communication path. Based at least in part on the first metadata tag, a second metadata tag may be determined that is associated with a second segmentation ecosystem applying the microsegmentation policy along a second portion of the communication path. The second metadata tag may, in some examples, be embedded within a second layer of the packet such that the second segmentation ecosystem is capable of applying the microsegmentation policy to the packet along the second portion of the communication path.

The techniques described herein may be performed as a method and/or by a system having non-transitory computer-readable media storing computer-executable instructions that, when executed by one or more processors, cause the system to perform the techniques described above and herein.

Example Embodiments

As noted above, application performance management technologies have a unique visibility into aspects of business transactions that are not available to other types of monitoring tools found in the OS, network, and/or other components. However, this application performance management information is rarely shared, if ever, with other technologies that would benefit from having a correlated view of the business transaction purpose and/or the individual user profile requesting the transaction. This information can include important context such as user identity, user's role, client geo, login failures, code path, transaction purpose, transaction name, application server type, vulnerability status, etc.

This application describes technologies associated with performing end-to-end microsegmentation for network communication transactions at both the application and network layers. For instance, application-level context may be leveraged at a workload to apply microsegmentation policies from end-to-end over an entire network communication path. These microsegmentation policies may, in some instances, have the granularity of whatever is possible at a given node along the communication path, but may ultimately enforce a transactional-level at the workload. Additionally, in some examples, the disclosed techniques may also perform a network-level segmentation that encompasses the transaction. For example, if a request (or response) is identifiable in a service mesh, the request can be segmented from other requests (or responses) within the service mesh. Similarly, certain developing communication technologies, such as Oblivious HTTP (OHTTP) being developed by the Internet Engineering Task Force (IETF), may be used to perform per request/response treatment that enables metadata tags and microsegmentation to be shared between the application and network layers of packets. Essentially, the techniques disclosed herein provide systems and methods for sharing context between the application and network layers to enforce microsegmentation polices at both layers for transactional-level microsegmentation across the entire communication path from the workload to the client, and vice-versa.

As used herein, a "network communication transaction," or "transaction," for short, means an individual communication event between two communicating computing nodes in a network, which may be represented by a network request and a corresponding response. Additionally, the term "network layer" as used herein does not necessarily mean just layer 3 (e.g., the network layer) of the OSI (Open Systems Interconnection) model but may be used to refer to any of layers 1-4 of the OSI model, individually and/or in combination (e.g., the physical layer, data link layer, network layer, and transport layer). Similarly, the term "application layer" as used herein does not necessarily mean just layer 7 (e.g., the application layer) of the OSI model, but may be used to refer to any of layers 5-7 of the OSI model, individually and/or in combination (e.g., the session layer, presentation layer, and application layer).

In some examples, Oblivious (e.g. OHTTP) family of technologies may be used to microsegment network communication transactions (e.g., request/response pairs) in a network, where the boundaries of a message can be known at a relay. It may, therefore, be feasible to apply network-level tagging (e.g., Security Group Tags (SGT), Network Service Headers (NSH), Generic UDP Encapsulation (GUE)/Geneve headers, Virtual Local Area Network (VLAN), or any other microsegmentation technique) to the message payloads because the relay can be aware of message boundaries and can ensure that each message is constrained to one or more packets on the network such that no packet carries more than one message (e.g., no multi-message packet payloads). Using this system, it is possible to apply tagging that is not only inside of the application layer itself via gateways but is also carried in the network by using relays and gateways to enforce packet boundaries and apply network-level tags to those packets.

Another exemplary implementation of the techniques disclosed herein may leverage Application Performance Monitoring (APM) and/or Runtime Application Self Protection (RASP) technologies to instrument transactions in such a way that the network can be aware of the transactions. In some examples, responses from an application server and/or workload may be packetized in such a way that all the contents of an individual response can be carried in one or more packet boundaries and tagged with network-level tags as previously described, ensuring multiple messages are not aggregated into common packets. This allows policies to be carried not only at the application layer, but also at the network layer to enforce microsegmentation at a transactional level from end-to-end. As such, a network-level enforcement ecosystem could treat each network communication transaction uniquely. For instance, when a service mesh technology is used that has visibility into the application layer of a packet, the transactional boundaries can be bidirectional (e.g., requests and responses). Similarly, in such a system, the transactional information can be shared with the network layer and the service mesh can ensure that the communications are packetized in such a way that both the requests and responses in the network are carried in packet boundary payloads. In other words, if a message were to span two packets, both packets would get the metadata tag to indicate it was part of a specific transaction. In examples, the system may ensure that messages were packetized on message boundaries such that two or more messages (request or response) would not be comingled into a single packet. This ensures that transactional information can be carried at the network-level. Additionally, network-level tags can be shared with the application layer as well, making the system fully bi-directional.

In some examples, application performance management technologies, such as application performance monitoring (APM), full stack observability (FSO), and the like may be leveraged to perform the techniques described herein. For instance, information from these technologies may be shared with network-level components, such as secure communication components (e.g., virtual private network (VPN), zero trust network access (ZTNA), secure shell (SSH), etc.), CASB (Cloud Access Security Broker) components, and/or the like by "injecting" relevant information about the workload transaction into a response HTTP header and/or in the form of a special JWT (JSON (JavaScript Object Notation) Web Token), which could consolidate the headers. In some examples, if the network-level components are "in line" and have the ability to decrypt the payload (e.g., using a public key, and assuming that the payload is encrypted), then this information about the transaction may be "consumed" and "ingested" by the network-level components to use the information in conjunction with Zero Trust policies to make intelligent decisions and actions such as blocking the transaction (e.g., response to a request), forcing a multi-factor authentication before allowing the transaction to be completed, recording the transaction, and/or taking other proactive security counter measures. Information such as geolocation, transaction sensitivity (e.g., money involved, private information involved (e.g., social security number)), user's role (e.g., admin), application status (e.g., Common Vulnerabilities and Exposures (CVEs)), etc. may go into the policy decision, making it possible to transform traditional network-level components, such as VPNs, into "application aware" security components. In some examples, metadata can also be shared bidirectionally such that application-level tags can be applied as network-level tags and vice-versa. Because the application layer has transactional awareness, the metadata at that layer may be applied to the network layer, providing transactional awareness to the network. Additionally, in some examples, the network stack may enforce packetization, meaning that each transaction may be segmented on the network in such a way as to be network-identifiable.

In some examples, these application performance management technologies (e.g., APM, FSO, etc.) may be configured to share information with Zero Trust Network components based on a policy as configured in the Zero Trust Network's policy server, which may be located in the cloud or SaaS. Once configured, the application performance management technology may "inject" transaction, correlation identifiers, application, component identifiers, and/or user information, among other things, into a response message, as well as monitor request messages for any "injected" headers or metadata, requesting information that was put in by upstream Zero Trust Network components. The "inline" Zero Trust Network components, such as a VPN, CASB, etc., may then have access to this application-level information in real time to make decisions and take action based on its own policy as configured in that same location. As noted, the metadata may be shared in either direction from application-level to network-level, and vice-versa.

In examples, the techniques described herein may also be used in an Open Telemetry (OTEL) or other cloud-native ecosystem, as OTEL uses HTTP headers to communicate the Online Transaction Processing (OLTP) wire protocol for path tracing. Because many application performance management technologies are moving to FSO cloud-native environments, the OTEL tracing system may be an ideal pipeline for communicating this same information among Zero Trust Network components that are "OTEL aware" to be able to pull important security context information (e.g., device, device role, user, user role, application, riskiness, etc.) from the OLTP payload as it is transmitted through the "inline" component(s), such as VPN, CASB, etc. In examples, the application-level components may take advantage of the OTEL API system to insert this security context information into "Baggage," which may be used to "propagate" context across Open Telemetry Spans and Traces. This type of system could evolve and effectively serve next generation application ecosystems on serverless and complex, scalable Kubernetes clusters, pods, and service meshes. As noted earlier this context (metadata) can also be carried in band with the session and then correlated later via a backend system that compares the in-band data with the OTEL auditing system.

By way of example, and not limitation, a method according to the techniques disclosed herein may include receiving a packet that is traversing a communication path through a network between a client device and a workload, the packet associated with a communication transaction between the client device and the workload. In some examples, the packet may be part of a request message or a response message of the communication transaction. For instance, the packet may be part of a request message that is being sent to the workload from the client device. Alternatively, the packet may be part of a response message that is being sent to the client device from the workload. Either way, the packet may be part of a specific communication transaction (e.g., request/response pair) between the client device and the workload.

In some examples, the communication path may traverse various networks, levels, and disparate systems between the client device and the workload, such as network-level systems and application-level systems. In examples, each of these different systems may deploy their own security and segmentation techniques. For instance, the communication path may include, as part of the network-level system(s), a secure communication session, such as a Zero Trust session, a VPN session, an SSH session, an SSL session, an IPsec session, a TLS or DTLS session, or another secure communication session/tunnel that microsegments traffic using network-level technology (e.g., SGT, VLAN, NSH, GUE, GENEVE, etc.). Additionally, the communication path may include, as part of the application-level system(s), APM tools/agents, FSO tools/agents, or the like that perform microsegmentation using application-level technology (e.g., transaction identifiers).

In some examples, the method may include determining that a first layer of the packet includes a first metadata tag associated with a first segmentation ecosystem applying a microsegmentation policy along a first portion of the communication path. For instance, the first layer of the packet may be an application layer of the packet, the first metadata tag may be an application-level tag, and the first segmentation ecosystem may be an application-level segmentation ecosystem. Alternatively, the first layer of the packet may be a network layer of the packet, the first metadata tag may be a network-level tag, and the first segmentation ecosystem may be a network-level segmentation ecosystem.

In some examples, based at least in part on the first metadata tag, a second metadata tag may be determined that is associated with a second segmentation ecosystem applying the microsegmentation policy along a second portion of the communication path. For instance, if the first layer of the packet is the application layer of the packet, the first metadata tag is the application-level tag, and the first segmentation ecosystem is the application-level segmentation ecosystem, then the second metadata tag may be a network-level tag, and the second segmentation ecosystem may be a network-level segmentation ecosystem. Alternatively, if the first layer of the packet is the network layer of the packet, the first metadata tag is the network-level tag, and the first segmentation ecosystem is the network-level segmentation ecosystem, then the second metadata tag may be an application-level tag, and the second segmentation ecosystem may be an application-level segmentation ecosystem.

In some examples, the second metadata tag may be determined by converting or otherwise translating the first metadata tag from a first format to a second format. For instance, the first format may be understandable by the first segmentation ecosystem and the second format may be understandable by the second segmentation ecosystem. In other words, the second segmentation ecosystem may be incapable of understanding metadata tags of the first format, and the first segmentation ecosystem may be incapable of understanding metadata tags of the second format.

In some examples, the second segmentation ecosystem may be incapable of accessing the first layer of the packet to utilize metadata tag(s) embedded in the first layer to apply the microsegmentation policy along the second portion of the communication path. Likewise, in some examples, the first segmentation ecosystem may be incapable of accessing the second layer of the packet to utilize metadata tag(s) embedded in the second layer to apply the microsegmentation policy along the first portion of the communication path.

In some examples, the method may include embedding the second metadata tag within a second layer of the packet such that the second segmentation ecosystem is capable of applying the microsegmentation policy to the packet along the second portion of the communication path. In some examples, the microsegmentation policy along the first portion and the second portion of the communication path may be to segment the packet from other packets associated with other communication transactions that are traversing at least one of the communication path or the network. In some examples, the packet may be one of multiple packets associated with the communication transaction, and embedding the second metadata tag within the second layer of the packet may further include embedding the second metadata tag within the second layer of each of the multiple packets associated with the communication transaction such that the second segmentation ecosystem is capable of applying the microsegmentation policy to the multiple packets to segment the communication transaction from other traffic traversing the network.

Certain implementations and embodiments of the disclosure will now be described more fully below with reference to the accompanying figures, in which various aspects are shown. However, the various aspects may be implemented in many different forms and should not be construed as limited to the implementations set forth herein. For instance, while several of the examples below are described with respect to protocols such as HTTP/3, MASQUE, UDP, TCP, and QUIC, the aspects of this disclosure can be implemented on similar systems utilizing different protocols and communication technologies. Additionally, while many of the examples described herein are in the context of communication transactions between a client device and a workload, other implementations are possible. For instance, any of the examples described above and herein could equally be applicable to communication transactions that are peer to peer, client to workload, workload to workload, client to server, etc. In other words, anywhere in this disclosure the terms "client device" and/or "workload" could be replaced with the terms "peer," "client," "workload," "server," etc. The disclosure encompasses variations of the embodiments, as described herein. Like numbers refer to like elements throughout.

FIG. 1 is an illustration 100 of the techniques described herein for performing end-to-end microsegmentation at both the application and network layers. A network microsegmentation ecosystem 102 and an application transactional microsegmentation ecosystem 104 may apply their respective microsegmentation policies to traffic flowing through their respective ecosystem.

In a typical arrangement, the network microsegmentation ecosystem 102 and the application transactional microsegmentation ecosystem 104 may apply policies independently of the other. For instance, the network microsegmentation ecosystem 102 may apply microsegmentation policies based on SGT, ACI, VLAN, GENEVE, GUE, etc. metadata tags included in a packet, and the application transactional microsegmentation ecosystem 104 may apply microsegmentation polices based on APM, WAF, RASP, etc. metadata tags included in a packet. However, under traditional circumstances, the network microsegmentation ecosystem 102 may not be capable of determining the application-level metadata tag included in the packet to apply policy, and the application transactional microsegmentation ecosystem 104 may not be capable of determining the network-level metadata tag included in the packet to apply policy.

The techniques of this disclosure enable for the network-level tags to be converted into application-level tags, and vice-versa, so that the different ecosystems can apply policy from end-to-end between two communicating computing nodes (e.g., a client device and a workload). Essentially, the techniques disclosed herein provide systems and methods for sharing context between the application and network layers to enforce microsegmentation polices at both of the network microsegmentation ecosystem 102 and the application transactional microsegmentation ecosystem 104 for transactional-level microsegmentation across the entire communication path.

FIG. 2 is another illustration 200 of the techniques described herein for performing end-to-end microsegmentation at the network level, service mesh level, and application level of a communication path. The network microsegmentation ecosystem 102 and the application transactional microsegmentation ecosystem 104 may apply their respective microsegmentation policies to traffic flowing through their respective ecosystem. Additionally, a service mesh microsegmentation ecosystem 202 may apply its own respective microsegmentation policies to the traffic flowing through its ecosystem.

In a typical arrangement, the network microsegmentation ecosystem 102, the application transactional microsegmentation ecosystem 104, and the service mesh microsegmentation ecosystem 202 may apply their policies independently of the other. For instance, the network microsegmentation ecosystem 102 may apply microsegmentation policies based on SGT, ACI, VLAN, GENEVE, GUE, etc. metadata tags included in a packet, the application transactional microsegmentation ecosystem 104 may apply microsegmentation polices based on APM, WAF, RASP, etc. metadata tags included in a packet, and the service mesh microsegmentation ecosystem 202 may apply its microsegmentation policies based on Istio, Envoy, Consul, Cilium, or other service mesh-level metadata included in the packet.

The techniques of this disclosure enable for the network-level tags to be converted into service mesh-level tags, the service mesh-level tags to be converted into application-level tags, and vice-versa, so that the different ecosystems can apply policy from end-to-end between two communicating computing nodes (e.g., a client device and a workload). Essentially, the techniques disclosed herein provide systems and methods for sharing context between different OSI layers to enforce transaction-level microsegmentation polices across the entire communication path at the network microsegmentation ecosystem 102, the service mesh microsegmentation ecosystem 202, and the application transactional microsegmentation ecosystem 104.

Figure 3:
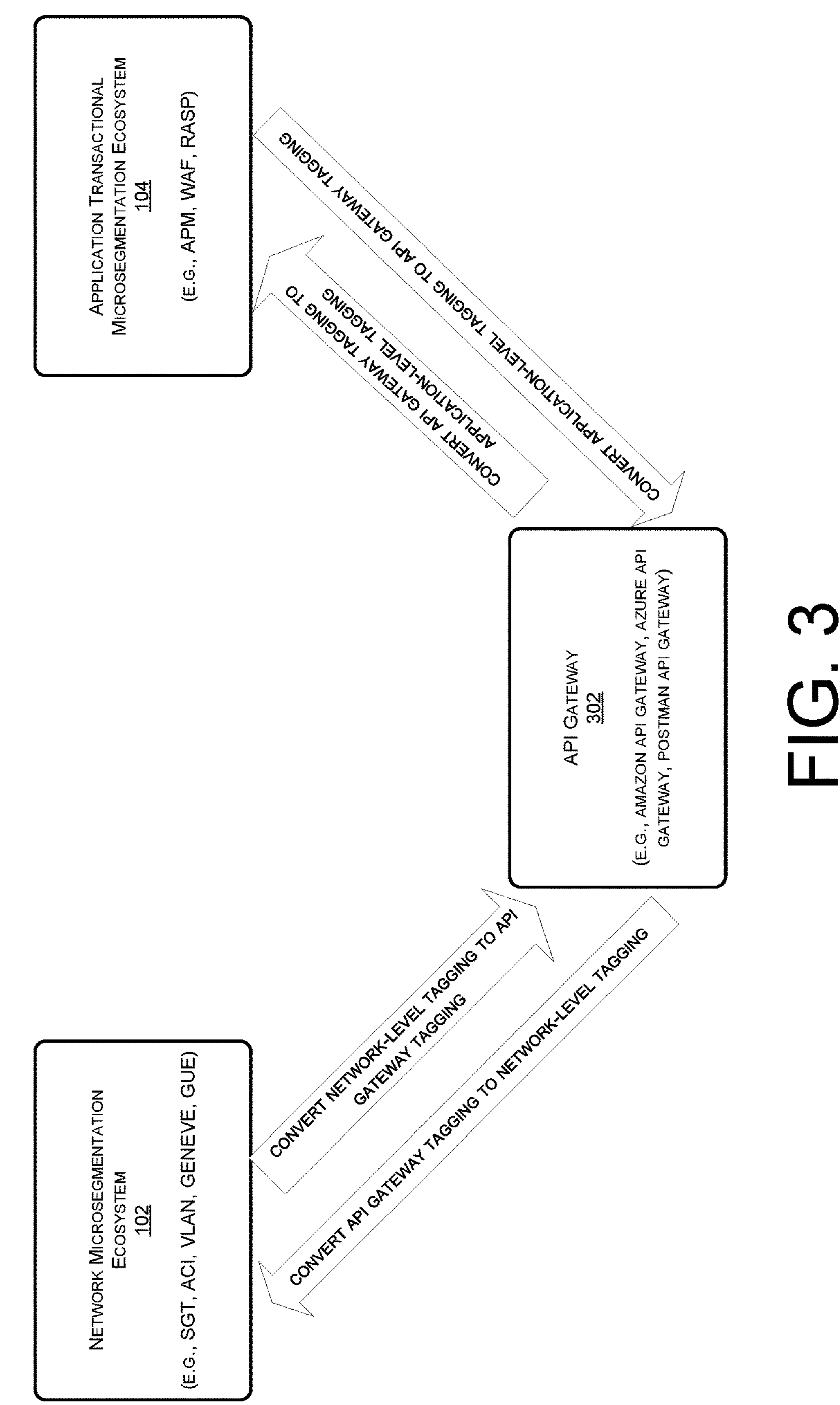
FIG. 3 is yet another illustration of the techniques described herein for performing end-to-end microsegmentation at the network level, API gateway level, and application level of a communication path.

FIG. 3 is yet another illustration 300 of the techniques described herein for performing end-to-end microsegmentation at the network-level, API gateway-level, and application-level of a communication path. The network microsegmentation ecosystem 102 and the application transactional microsegmentation ecosystem 104 may apply their respective microsegmentation policies to traffic flowing through their respective ecosystem. Additionally, an API (Application Programming Interface) gateway 302 may apply its own respective microsegmentation policies to the traffic flowing through its ecosystem.

In examples, the network microsegmentation ecosystem 102 may apply microsegmentation policies based on SGT, ACI, VLAN, GENEVE, GUE, etc. metadata tags included in a packet. The application transactional microsegmentation ecosystem 104 may apply microsegmentation polices based on APM, WAF, RASP, etc. metadata tags included in a packet. Additionally, the API gateway may apply its microsegmentation policies based on Amzon API gateway, Azure API gateway, Postman API gateway, or other API gateway-level metadata included in the packet.

The techniques of this disclosure enable for the network-level tags to be converted into API gateway-level tags, the API gateway-level tags to be converted into application-level tags, and vice-versa, so that the different ecosystems can apply policy from end-to-end between two communicating computing nodes (e.g., a client device and a workload). Essentially, the techniques disclosed herein provide systems and methods for sharing context between different OSI layers to enforce transaction-level microsegmentation polices across the entire communication path at the network microsegmentation ecosystem 102, the API gateway 302, and the application transactional microsegmentation ecosystem 104.

Figure 4:
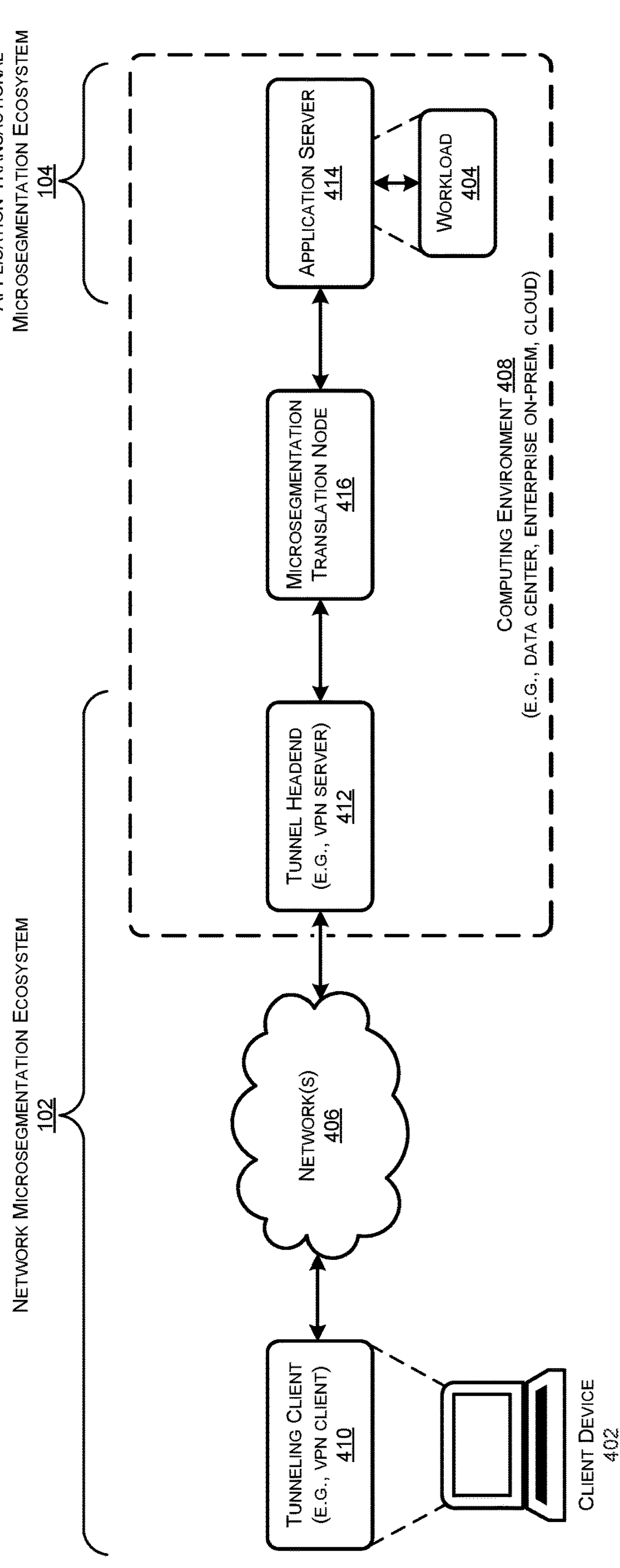
FIG. 4 illustrates an example architecture in which the techniques of this disclosure may be performed.

FIG. 4 illustrates an example architecture 400 in which various aspects of the techniques described in this disclosure may be performed. The architecture 400 includes a client device 402 that is communicating with a workload 404 over one or more network(s) 406.

In the example architecture 400 shown in FIG. 4, the workload 404 is running in a computing environment 408 that is remote from the client device 402, and the client device 402 is using a secure communication session to communicate over the network(s) 406 to the workload 404. For instance, a tunneling client 410 (e.g., VPN client) is running on the client device 402 to tunnel traffic through the network(s) 406 to the tunnel headend 412 (e.g., VPN server), which may be located at or near an edge of the computing environment 408. In some examples, one or more devices and/or nodes associated with the communication path between the tunneling client 410 and the tunnel headend 412 may be associated with the network microsegmentation ecosystem 102. That is, the one or more devices and/or nodes associated with the communication path between the tunneling client 410 and the tunnel headend 412, including the tunneling client 410 and/or the tunnel headend 412, may enforce microsegmentation policies at the network-level. For instance, these devices/nodes that are part of the network microsegmentation ecosystem 102 may have visibility to identify network-level metadata tags that are carried within a network layer of packets that are traversing the communication path, and then enforce policy based on those metadata tags.

In examples, traffic flows to the workload 404 may be managed by an application server 414. The application server 414 and/or any other nodes, devices, or agents associated with forwarding traffic between the application server 414 and the workload 404 may be associated with the application transactional microsegmentation ecosystem 104. That is, the application server 414 and/or any of the other nodes, devices, or agents associated with the communication path between the application server 414 and the workload 404 may enforce microsegmentation policies at the application-level. For instance, these devices/nodes that are part of the application transactional microsegmentation ecosystem 104 may have visibility to identify application-level metadata tags that are carried within an application layer of packets that are traversing the communication path, and then enforce policy based on those metadata tags.

In some examples, the architecture 400 may include a microsegmentation translation node 416 that is configured to perform aspects of the technologies disclosed herein for converting application-level transaction tags into network-level metadata tags, and vice-versa, to enable end-to-end microsegmentation policy enforcement on a transactional level.

For example, the microsegmentation translation node 416 may receive a packet that is traversing the communication path between the client device and a workload, the packet associated with a communication transaction between the client device 402 and the workload 404. The microsegmentation translation node 416 may, in some examples, determine that a first layer (e.g., application layer) of the packet includes a first metadata tag (e.g., application/workload transaction metadata) associated with a first segmentation ecosystem (e.g., the application transactional microsegmentation ecosystem 104) applying a microsegmentation policy along a first portion of the communication path. Based at least in part on the first metadata tag, the microsegmentation translation node 416 may determine a second metadata tag (e.g., network-level metadata) that is associated with a second segmentation ecosystem (e.g., the network microsegmentation ecosystem 102) applying the microsegmentation policy along a second portion of the communication path. In some examples, the microsegmentation translation node 416 may embed the second metadata tag within a second layer (e.g., network layer) of the packet such that the second segmentation ecosystem is capable of applying the microsegmentation policy to the packet along the second portion of the communication path.

FIG. 5 illustrates an example relay and gateway architecture 500 in which aspects of the various techniques of this disclosure may be performed. The architecture 500 shows a communication path between the client device 402 and the workload 404 that includes a relay 502 (e.g., an oblivious relay), a gateway 504 (e.g., an oblivious gateway), and the application server 414. In such an example, the traffic sent between at least the relay 502 and the gateway may have an encrypted payload. For instance, the traffic may be OHTTP traffic, but other types of encryption are possible, as described herein.

In examples, the relay 502 may be configured to relay requests and responses of network communication transactions between the client device 402 and the workload 404. However, the relay may not have the ability to decrypt the request and/or response packets. Instead, the relay 502 may enforce packet boundaries and apply network-level tagging (e.g., metadata tags) to the packets. In examples, the packets that are received at the relay 502 may contain requests and/or responses that ensure any given packet only carries one request or response (e.g., no overlap). Additionally, multiple packets associated with a given request or response may carry a common metadata tag.

In examples, the gateway 504 may have the ability to see the contents of request and/or response messages and apply both application-level and network-level metadata tags. Additionally, the gateway 504 may be capable of applying tags to encrypted response message payloads that are directed towards the relay 502. In examples, the gateway 504 may also enforce packetization boundaries for requests and responses between the gateway 504 and the application server 414.

In some examples, the traffic between the relay 502 and the gateway 504 may be, for instance, an OHTTP encrypted payload that includes the network-level metadata tag(s), and the traffic between the gateway 504 and the application server 414 may be application payload that includes the application-level metadata tag(s).

Figure 6:
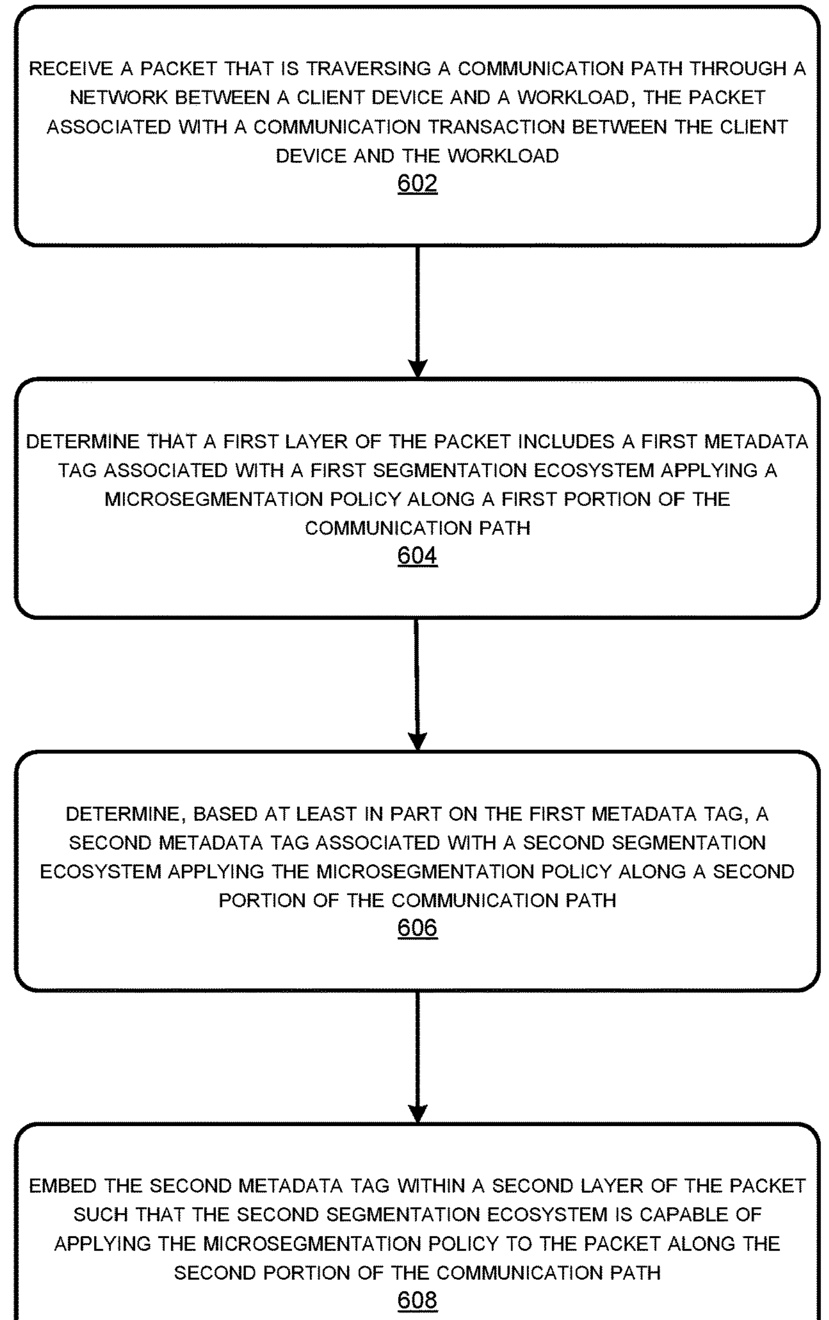
FIG. 6 is a flow diagram illustrating an example method associated with the techniques described herein for performing end-to-end microsegmentation at both the application and network layers.

FIG. 6 is a flow diagram illustrating an example method 600 associated with the techniques described herein for performing end-to-end microsegmentation at both the application and network layers. The logical operations described herein with respect to FIG. 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 600 begins at operation 602, which includes receiving a packet that is traversing a communication path through a network between a client device and a workload, the packet associated with a communication transaction between the client device and the workload. For instance, the microsegmentation translation node 416 or the gateway 504 may receive the packet that is traversing the communication path between the client device 402 and the workload 404.

At operation 604, the method 600 includes determining that a first layer of the packet includes a first metadata tag associated with a first segmentation ecosystem applying a microsegmentation policy along a first portion of the communication path. For instance, the microsegmentation translation node 416 or the gateway 504 may determine that the first layer of the packet includes the first metadata tag associated with the first segmentation ecosystem applying a microsegmentation policy along a first portion of the communication path.

At operation 606, the method 600 includes determining, based at least in part on the first metadata tag, a second metadata tag associated with a second segmentation ecosystem applying the microsegmentation policy along a second portion of the communication path. For instance, the microsegmentation translation node 416 or the gateway 504 may determine the second metadata tag associated with the second segmentation ecosystem applying the microsegmentation policy along the second portion of the communication path.

At operation 608, the method 600 includes embedding the second metadata tag within a second layer of the packet such that the second segmentation ecosystem is capable of applying the microsegmentation policy to the packet along the second portion of the communication path. For instance, the microsegmentation translation node 416 or the gateway 504 may embed the second metadata tag within the second layer of the packet such that the second segmentation ecosystem is capable of applying the microsegmentation policy to the packet along the second portion of the communication path.

Figure 7:
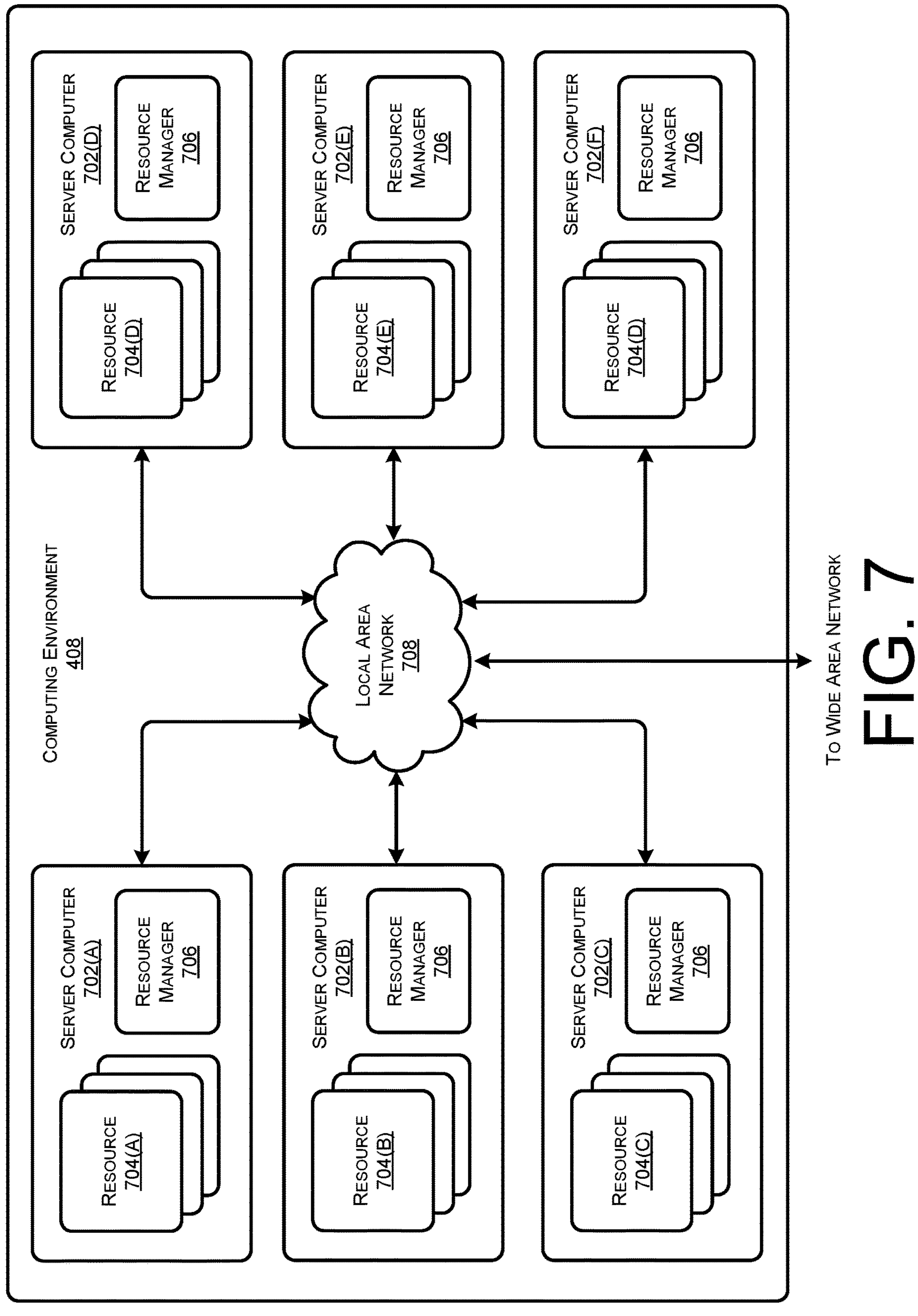
FIG. 7 is a computing system diagram illustrating an example configuration of a computing environment in which aspects of the technologies disclosed herein may be performed.

FIG. 7 is a computing system diagram illustrating an example configuration of the computing environment 408 that can be utilized to implement aspects of the technologies disclosed herein. The example computing environment 408 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, the any type of networked device described herein. Although described as servers, the server computers 702 may comprise any type of networked device, such as servers, switches, routers, hubs, bridges, gateways, modems, repeaters, access points, etc.

The server computers 702 can be standard tower, rackmount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, VPNs, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the computing environment 408 can also be configured to provide network services and other types of services.

In the example computing environment 408 shown in FIG. 7, an appropriate LAN 708 (local area network) is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers, between each of the server computers 702A-702F in each computing environment 408, and, potentially, between computing resources in each of the server computers 702. It should be appreciated that the configuration of the computing environment 408 described with reference to FIG. 7 is merely illustrative and that other implementations can be utilized.

In some instances, the computing environment 408 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like tenant containers and VM instances, data storage resources, networking resources, data communication resources, network services, VPN instances, and the like. The computing resources 704 shown in FIG. 7 may correspond with the workload 404 described in FIGS. 4 and 5.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a computing environment 408" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a computing environment 408 that can be utilized to implement the technologies disclosed herein will be described below with regard to FIG. 8.

Figure 8:
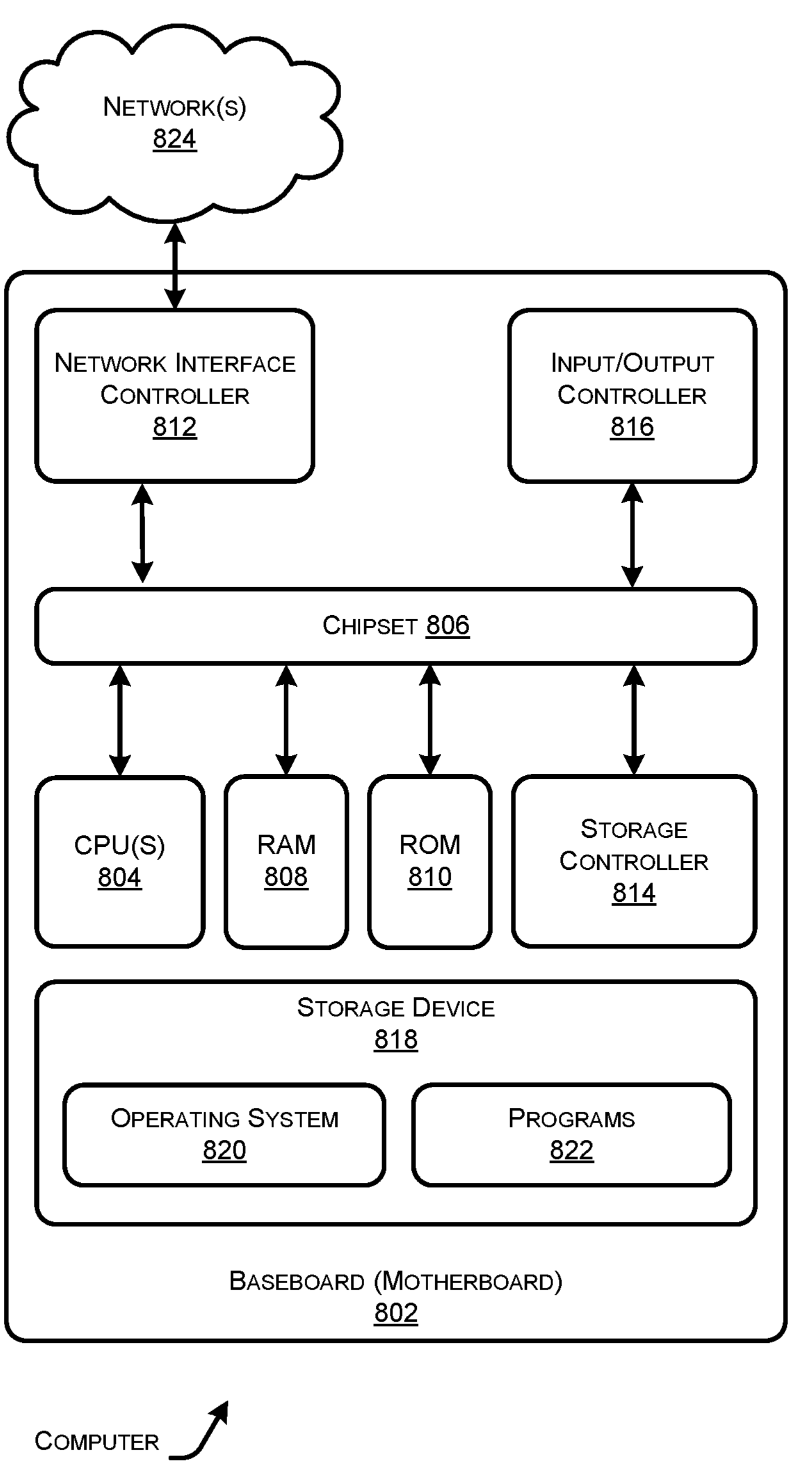
FIG. 8 is a computer architecture diagram showing an illustrative computer hardware architecture for implementing a computing device that can be utilized to implement aspects of the various technologies presented herein.

FIG. 8 is a computer architecture diagram showing an illustrative computer hardware architecture for implementing a computing device that can be utilized to implement aspects of the various technologies presented herein. The computer architecture shown in FIG. 8 illustrates a conventional server computer, network node (e.g., secure access node), router, workstation, desktop computer, laptop, tablet, network appliance, e-reader, smartphone, load balancer, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network. The chipset 806 can include functionality for providing network connectivity through a NIC 812, such as a gigabit Ethernet adapter. The NIC 812 is capable of connecting the computer 800 to other computing devices over the network 824. It should be appreciated that multiple NICs 812 can be present in the computer 800, connecting the computer to other types of networks and remote computer systems. In some examples, the NIC 812 may be configured to perform at least some of the techniques described herein.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the architecture 400 and or any components included therein, may be supported by one or more devices similar to computer 800. Stated otherwise, some or all of the operations performed by the architecture 400, and or any components included therein, may be performed by one or more computer devices 800 operating in a scalable arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes and functionality described above with regard to FIGS. 1-7, and herein. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

The computer 800 may include one or more hardware processors (processors) configured to execute one or more stored instructions. The processor(s) may comprise one or more cores. Further, the computer 800 may include one or more network interfaces configured to provide communications between the computer 800 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for sharing context between application and network layers to enforce microsegmentation polices at both layers for transactional-level microsegmentation across an entire communication path from a workload to a client, and vice-versa.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving a protocol data unit that is traversing a communication path through a network between a client device and a workload, the protocol data unit associated with a communication transaction between the client device and the workload;

determining that the protocol data unit includes a first metadata tag associated with a first layer in a communication reference model, the first metadata tag associated with a first segmentation ecosystem applying a microsegmentation policy along a first portion of the communication path; and converting the first metadata tag into a second metadata tag associated with a second layer in the communication reference model, the first and second layers being different layers in the communication reference model, the converting including embedding the second metadata tag within a second layer of the protocol data unit to enable a second segmentation ecosystem to apply the microsegmentation policy to the protocol data unit along a second portion of the communication path.

2. The method of claim 1, wherein the second segmentation ecosystem is incapable of accessing a first layer of the protocol data unit to utilize the first metadata tag to apply the microsegmentation policy along the second portion of the communication path.

3. The method of claim 1, wherein the first portion of the communication path is at least one of a virtual private network (VPN) session, a zero-trust network access (ZTNA) session, or a secure shell (SSH) session between the client device and the workload and the second portion of the communication path is an application-level session between the client device and the workload.

4. The method of claim 1, wherein the first layer is an application layer and the second layer is a network layer.

5. The method of claim 1, wherein the first segmentation ecosystem is an application-level microsegmentation ecosystem and the second segmentation ecosystem is a network-level segmentation ecosystem.

6. The method of claim 1, wherein applying the microsegmentation policy along the second portion of the communication path comprises segmenting the protocol data unit from other protocol data units associated with other communication transactions that are traversing at least one of the communication path or the network.

7. The method of claim 1, wherein the protocol data unit is one of multiple protocol data units associated with the communication transaction, and wherein embedding the second metadata tag within the second layer of the protocol data unit comprises embedding the second metadata tag within the second layer of each of the multiple protocol data units associated with the communication transaction such that the second segmentation ecosystem is capable of applying the microsegmentation policy to the multiple protocol data units to segment the communication transaction from other traffic traversing the network.

8. A system comprising:

one or more processors; and one or more non-transitory computer-readable media storing instructions that, when executed, caused the one or more processors to perform operations comprising:

receiving a protocol data unit that is traversing a communication path through a network between a client device and a workload, the protocol data unit associated with a communication transaction between the client device and the workload;

determining that the protocol data unit includes a first metadata tag associated with a first layer in a communication reference model, the first metadata tag associated with a first segmentation ecosystem applying a microsegmentation policy along a first portion of the communication path; and converting the first metadata tag into a second metadata tag associated with a second layer in the communication reference model, the first and second layers being different layers in the communication reference model, the converting including embedding the second metadata tag within a second layer of the protocol data unit to enable a second segmentation ecosystem to apply the microsegmentation policy to the protocol data unit along a second portion of the communication path.

9. The method of claim 1, wherein the second segmentation ecosystem is incapable of accessing a first layer of the protocol data unit to utilize the first metadata tag to apply the microsegmentation policy along the second portion of the communication path.

10. The system of claim 8, wherein the first portion of the communication path is at least one of a virtual private network (VPN) session, a zero-trust network access (ZTNA) session, or a secure shell (SSH) session between the client device and the workload and the second portion of the communication path is an application-level session between the client device and the workload.

11. The system of claim 8, wherein the first layer is an application layer and the second layer is a network layer.

12. The system of claim 8, wherein the first segmentation ecosystem is an application-level microsegmentation ecosystem and the second segmentation ecosystem is a network-level segmentation ecosystem.

13. The system of claim 8, wherein applying the microsegmentation policy along the second portion of the communication path comprises segmenting the protocol data unit from other protocol data units associated with other communication transactions that are traversing at least one of the communication path or the network.

14. The system of claim 8, wherein the protocol data unit is one of multiple protocol data units associated with the communication transaction, and wherein embedding the second metadata tag within the second layer of the protocol data unit comprises embedding the second metadata tag within the second layer of each of the multiple protocol data units associated with the communication transaction such that the second segmentation ecosystem is capable of applying the microsegmentation policy to the multiple protocol data units to segment the communication transaction from other traffic traversing the network.

15. A non-transitory computer-readable medium storing instructions that, when executed, cause one or more processors to perform operations comprising:

receiving a protocol data unit that is traversing a communication path through a network between a client device and a workload, the protocol data unit associated with a communication transaction between the client device and the workload;

determining that the protocol data unit includes a first metadata tag associated with a first layer in a communication reference model, the first metadata tag associated with a first segmentation ecosystem applying a microsegmentation policy along a first portion of the communication path; and converting the first metadata tag into a second metadata tag associated with a second layer in the communication reference model, the first and second layers being different layers in the communication reference model, the converting including embedding the second metadata tag within a second layer of the protocol data unit to enable a second segmentation ecosystem to apply the microsegmentation policy to the protocol data unit along a second portion of the communication path.

16. The method of claim 1, wherein the second segmentation ecosystem is incapable of accessing a first layer of the protocol data unit to utilize the first metadata tag to apply the microsegmentation policy along the second portion of the communication path.

17. The non-transitory computer-readable medium of claim 15, wherein the first portion of the communication path is at least one of a virtual private network (VPN) session, a zero-trust network access (ZTNA) session, or a secure shell (SSH) session between the client device and the workload and the second portion of the communication path is an application-level session between the client device and the workload.

18. The non-transitory computer-readable medium of claim 15, wherein the first layer is an application layer and the second layer is a network layer.

19. The non-transitory computer-readable medium of claim 15, wherein the first segmentation ecosystem is an application-level microsegmentation ecosystem and the second segmentation ecosystem is a network-level segmentation ecosystem.

20. The non-transitory computer-readable medium of claim 15, wherein applying the microsegmentation policy along the second portion of the communication path comprises segmenting the protocol data unit from other protocol data units associated with other communication transactions that are traversing at least one of the communication path or the network.

* * * * *